(12) United States Patent
Deshmukh et al.

(10) Patent No.: US 8,990,285 B2
(45) Date of Patent: *Mar. 24, 2015

(54) PRE-SUMMARIZATION AND ANALYSIS OF RESULTS GENERATED BY AN AGENT

(75) Inventors: Vijay Deshmukh, Mountain View, CA (US); Benjamin Swartzlander, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/074,178

(22) Filed: Feb. 29, 2008

(65) Prior Publication Data

US 2008/0155011 A1    Jun. 26, 2008

Related U.S. Application Data

(62) Division of application No. 10/798,990, filed on Mar. 12, 2004, now Pat. No. 7,539,702.

(51) Int. Cl.
*G06F 15/16* (2006.01)
*H04L 29/08* (2006.01)
*G06F 7/00* (2006.01)
*G06F 17/30* (2006.01)

(52) U.S. Cl.
CPC ...... *G06F 17/30067* (2013.01); *H04L 67/1097* (2013.01); *H04L 67/14* (2013.01); *Y10S 707/99931* (2013.01)
USPC ..... 709/202; 709/201; 707/770; 707/999.001

(58) Field of Classification Search
CPC ............... H04L 67/14; H04L 67/1097; G06F 17/30067

USPC .................................. 709/202, 201; 707/770
See application file for complete search history.

(56) References Cited

U.S. PATENT DOCUMENTS

| | | | |
|---|---|---|---|
| 5,146,540 | A | 9/1992 | Natarajan |
| 5,313,631 | A | 5/1994 | Kao |
| 5,555,417 | A | 9/1996 | Odnert et al. |
| 5,566,328 | A | 10/1996 | Eastep |
| 5,970,494 | A | 10/1999 | Velissaropoulos et al. |
| 5,987,506 | A | 11/1999 | Carter et al. |

(Continued)

FOREIGN PATENT DOCUMENTS

WO        WO 02/25870        3/2002

OTHER PUBLICATIONS

Marshall, David, "Threads: Basic Theory and Libraries," May 1999, pp. 2-32.

(Continued)

*Primary Examiner* — Evans Desrosiers
*Assistant Examiner* — Lawrence Cosby
(74) *Attorney, Agent, or Firm* — Perkins Coie LLP

(57) ABSTRACT

According to an embodiment of the invention, an agent scans a storage server, and collects information about files stored on the storage server. The agent then summarizes the information into a summary, and stores the summary on a database server. The summaries can be accessed by a system administrator using a graphical user interface (GUI). The summaries contain information about the use of the storage server, and highlight potential problem areas. By having an agent, rather than a multi-appliance management application (MMA) scan the storage server and create the summary, the MMA is able to perform other tasks.

18 Claims, 6 Drawing Sheets

(56) References Cited

U.S. PATENT DOCUMENTS

| | | | |
|---|---|---|---|
| 5,999,930 A | 12/1999 | Wolff | |
| 6,023,706 A | 2/2000 | Schmuck et al. | |
| 6,052,724 A | 4/2000 | Willie et al. | |
| 6,072,936 A | 6/2000 | Koyama | |
| 6,122,664 A * | 9/2000 | Boukobza et al. | 709/224 |
| 6,138,249 A | 10/2000 | Nolet | |
| 6,192,191 B1 | 2/2001 | Suga et al. | |
| 6,199,082 B1 | 3/2001 | Ferrel et al. | |
| 6,208,999 B1 | 3/2001 | Spllo et al. | |
| 6,292,797 B1 | 9/2001 | Tuzhilin et al. | |
| 6,298,349 B1 | 10/2001 | Toyoshima et al. | |
| 6,311,194 B1 | 10/2001 | Sheth et al. | |
| 6,356,902 B1 | 3/2002 | Tan et al. | |
| 6,389,427 B1 | 5/2002 | Faulkner | |
| 6,430,611 B1 * | 8/2002 | Kita et al. | 709/223 |
| 6,457,017 B2 | 9/2002 | Watkins et al. | |
| 6,480,901 B1 * | 11/2002 | Weber et al. | 709/246 |
| 6,519,612 B1 | 2/2003 | Howard et al. | |
| 6,553,377 B1 | 4/2003 | Eschelbeck et al. | |
| 6,563,521 B1 | 5/2003 | Pettunen | |
| 6,571,257 B1 * | 5/2003 | Duggan et al. | 1/1 |
| 6,578,048 B1 | 6/2003 | Mauldin | |
| 6,625,615 B2 | 9/2003 | Shi et al. | |
| 6,625,624 B1 | 9/2003 | Chen et al. | |
| 6,636,250 B1 | 10/2003 | Gasser et al. | |
| 6,687,729 B1 | 2/2004 | Sievert et al. | |
| 6,725,261 B1 | 4/2004 | Novaes et al. | |
| 6,754,890 B1 | 6/2004 | Berry et al. | |
| 6,801,903 B2 | 10/2004 | Brown et al. | |
| 6,857,012 B2 | 2/2005 | Sim et al. | |
| 6,915,409 B1 | 7/2005 | Peterson | |
| 6,922,708 B1 | 7/2005 | Sedlar | |
| 6,947,940 B2 | 9/2005 | Anderson et al. | |
| 6,961,909 B2 | 11/2005 | Lord et al. | |
| 6,973,577 B1 | 12/2005 | Kouznetsov | |
| 7,007,024 B2 | 2/2006 | Zelenka | |
| 7,007,244 B2 | 2/2006 | Pankovcin | |
| 7,013,323 B1 | 3/2006 | Thomas et al. | |
| 7,024,427 B2 | 4/2006 | Bobbitt et al. | |
| 7,054,927 B2 | 5/2006 | Ulrich et al. | |
| 7,080,277 B2 | 7/2006 | Anna et al. | |
| 7,089,313 B2 | 8/2006 | Lee | |
| 7,096,315 B2 | 8/2006 | Takeda et al. | |
| 7,120,757 B2 | 10/2006 | Tsuge | |
| 7,139,811 B2 | 11/2006 | Lev Ran et al. | |
| 7,167,915 B2 | 1/2007 | Bendich et al. | |
| 7,203,731 B1 | 4/2007 | Coates et al. | |
| 7,275,063 B2 | 9/2007 | Horn | |
| 7,289,973 B2 | 10/2007 | Kiessig et al. | |
| 7,293,039 B1 | 11/2007 | Deshmukh et al. | |
| 7,433,942 B2 | 10/2008 | Butt et al. | |
| 7,539,702 B2 | 5/2009 | Deshmukh et al. | |
| 7,630,994 B1 | 12/2009 | Deshmukh et al. | |
| 7,844,646 B1 | 11/2010 | Deshmukh et al. | |
| 8,024,309 B1 | 9/2011 | Deshmukh et al. | |
| 8,612,404 B2 * | 12/2013 | Bone et al. | 707/694 |
| 2002/0049782 A1 | 4/2002 | Herzenberg et al. | |
| 2002/0091710 A1 * | 7/2002 | Dunham et al. | 707/200 |
| 2002/0120672 A1 * | 8/2002 | Butt et al. | 709/202 |
| 2002/0147805 A1 | 10/2002 | Leshem et al. | |
| 2002/0175938 A1 | 11/2002 | Hackworth | |
| 2003/0046369 A1 | 3/2003 | Sim et al. | |
| 2003/0115218 A1 | 6/2003 | Bobbitt et al. | |
| 2004/0030586 A1 | 2/2004 | Cucchiara et al. | |
| 2004/0078461 A1 * | 4/2004 | Bendich et al. | 709/224 |
| 2004/0098363 A1 * | 5/2004 | Anglin et al. | 707/1 |
| 2004/0098383 A1 | 5/2004 | Tabellion et al. | |
| 2004/0122936 A1 | 6/2004 | Mizelle et al. | |
| 2004/0133606 A1 | 7/2004 | Miloushev et al. | |
| 2004/0143608 A1 | 7/2004 | Nakano et al. | |
| 2004/0181605 A1 | 9/2004 | Nakatani et al. | |
| 2004/0196970 A1 | 10/2004 | Cole | |
| 2004/0205143 A1 | 10/2004 | Uemura | |
| 2005/0022153 A1 | 1/2005 | Hwang | |
| 2005/0050269 A1 | 3/2005 | Horn | |
| 2005/0086192 A1 | 4/2005 | Kodama | |
| 2005/0102289 A1 | 5/2005 | Sonoda et al. | |
| 2005/0108474 A1 | 5/2005 | Zhang et al. | |
| 2005/0108484 A1 | 5/2005 | Park | |
| 2005/0166094 A1 | 7/2005 | Blackwell et al. | |
| 2006/0041656 A1 | 2/2006 | Li et al. | |
| 2008/0091739 A1 | 4/2008 | Bone et al. | |

OTHER PUBLICATIONS

Co-pending U.S. Appl. No. 10/798,990, filed Mar. 12, 2004.
Co-pending U.S. Appl. No. 10/799,861, filed Mar. 12, 2004.
Co-pending U.S. Appl. No. 10/800,163, filed Mar. 12, 2004.
Co-pending U.S. Appl. No. 10/798,987, filed Mar. 12, 2004.
Co-pending U.S. Appl. No. 11/848,165, filed Aug. 30, 2007.
Notice of Allowance Mailed Jan. 15, 2010 in Co-Pending U.S. Appl. No. 10/800,163, filed Mar. 12, 2004.
Non-Final Office Action Mailed Jul. 8, 2009 in Co-Pending U.S. Appl. No. 10/800,163, filed Mar. 12, 2004.
Final Office Action Mailed Sep. 24, 2008 in Co-Pending U.S. Appl. No. 10/800,163, filed Mar. 12, 2004.
Non-Final Office Action Mailed Feb. 20, 2008 in Co-Pending U.S. Appl. No. 10/800,163, filed Mar. 12, 2004.
Final Office Action Mailed Jul. 30, 2007 in Co-Pending U.S. Appl. No. 10/800,163, filed Mar. 12, 2004.
Non-Final Office Action Mailed Sep. 28, 2006 in Co-Pending U.S. Appl. No. 10/800,163, filed Mar. 12, 2004.
Notice of Allowance Mailed Feb. 9, 2009 in Co-pending U.S. Appl. No. 10/798,990, filed Mar. 12, 2004.
Non-Final Office Action Mailed Aug. 18, 2008 in Co-pending U.S. Appl. No. 10/798,990, filed Mar. 12, 2004.
Final Office Action Mailed May 1, 2008 in Co-pending U.S. Appl. No. 10/798,990, filed Mar. 12, 2004.
Non-Final Office Action Mailed Aug. 19, 2007 in Co-pending U.S. Appl. No. 10/798,990, filed Mar. 12, 2004.
Final Office Action Mailed Apr. 4, 2007 in Co-pending U.S. Appl. No. 10/798,990, filed Mar. 12, 2004.
Non-Final Office Action Mailed Oct. 2, 2006 in Co-pending U.S. Appl. No. 10/798,990, filed Mar. 12, 2004.
Notice of Allowance Mailed Jul. 29, 2009 in Co-pending U.S. Appl. No. 10/799,861, filed Mar. 12, 2004.
Non-Final Office Action Mailed Feb. 6, 2009 in Co-pending U.S. Appl. No. 10/799,861, filed Mar. 12, 2004.
Final Office Action Mailed Oct. 16, 2008 in Co-pending U.S. Appl. No. 10/799,861, filed Mar. 12, 2004.
Non-Final Office Action Mailed Apr. 21, 2008 in Co-pending U.S. Appl. No. 10/799,861, filed Mar. 12, 2004.
Non-Final Office Action Mailed Sep. 17, 2007 in Co-pending U.S. Appl. No. 10/799,861, filed Mar. 12, 2004.
Final Office Action Mailed Apr. 4, 2007 in Co-pending U.S. Appl. No. 10/799,861, filed Mar. 12, 2004.
Non-Final Office Action Mailed Sep. 20, 2006 in Co-pending U.S. Appl. No. 10/799,861, filed Mar. 12, 2004.
Notice of Allowance Mailed Jul. 6, 2007 in Co-pending U.S. Appl. No. 10/798,987, filed Mar. 12, 2004.
Final Office Action Mailed Mar. 19, 2007 in Co-pending U.S. Appl. No. 10/798,987, filed Mar. 12, 2004.
Non-Final Office Action Mailed Sep. 27, 2006 in Co-pending U.S. Appl. No. 10/798,987, filed Mar. 12, 2004.
Notice of Allowance Mailed May 5, 2010 in Co-Pending U.S. Appl. No. 10/800,163, filed Mar. 12, 2004.
Non-Final Office Action Mailed Jul. 27, 2010 in Co-Pending U.S. Appl. No. 11/848,165, filed Aug. 30, 2007.
Notice of Allowance Mailed Sep. 1, 2010 in Co-Pending U.S. Appl. No. 10/800,163, filed Mar. 12, 2004.
Non-Final Office Action Mailed Jan. 5, 2011 in Co-Pending U.S. Appl. No. 11/848,165, filed Aug. 30, 2007.
Non-Final Office Action Mailed Sep. 19, 2007 in Co-pending U.S. Appl. No. 10/798,990 of Deshmukh, V., et al., filed Mar. 12, 2004.
Advisory Action Mailed Jan. 9, 2009 in Co-Pending U.S. Appl. No. 10/800,163 of Deshmukh, V., et al., filed Mar. 12, 2004.
Notice of Allowance Mailed Jul. 1, 2011 in Co-Pending U.S. Appl. No. 11/848,166 of Deshmukh, V., et al., filed Aug. 30, 2007.

* cited by examiner

| | Name | Time Last Accessed |
|---|---|---|
| 402 — Least Recently Accessed | /u/users/b/baker/banner.jpg | 02.04.1999 2:48am |
| | Name | Size |
| 404 — Largest | /u/users/j/jones/bigmovie.mpg | 2.7GB |
| | Name | Size |
| 406 — Smallest | /u/users/r/roberts/go.txt | 27 bytes |
| | Name | Date |
| 408 — Oldest | /u/oldfiles/DOS/command.com | 01.01.1980 12:01am |

FIG. 4

| Directory Name 502 | Number of Files 504 | Total Size 506 | Average Access Time 508 |
|---|---|---|---|
| /u/ | 2142 | 873MB | 02.06.04 12:37 pm |
| /u/users/ | 18 | 47MB | 03.01.04 3:17 pm |
| /u/administrators/ | 14,312 | 25.3GB | 03.02.04 1:26 pm |
| /u/users/a/ | 42 | 1.2MB | 08.06.03 3:18 am |
| /u/users/a/Aaron | 4,362 | 6.6GB | 06.08.02 7:12 pm |

PRE-SUMMARIZATION AND ANALYSIS OF RESULTS GENERATED BY AN AGENT

CROSS-REFERENCE TO OTHER APPLICATIONS

This is a divisional application of U.S. patent application Ser. No. 10/798,990, filed on Mar. 12, 2004 now U.S. Pat. No. 7,539,702 and entitled, "PRE-SUMMARIZATION AND ANALYSIS OF RESULTS GENERATED BY AN AGENT," which is incorporated herein by reference.

FIELD OF THE INVENTION

At least one embodiment of the present invention pertains to networked storage systems, and more particularly to a method and apparatus for collecting and reporting data pertaining to files stored on a storage server.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A filer may be connected to a network, and may serve as a storage device for several users, or clients, of the network. For example, the filer may store user directories and files for a corporate or other network, such as a LAN or a wide area network (WAN). Users of the network can be assigned an individual directory in which they can store personal files. A user's directory can then be accessed from computers connected to the network.

A system administrator can maintain the filer, ensuring that the filer continues to have adequate free space, that certain users are not monopolizing storage on the filer, etc. A Multi-Appliance Management Application (MMA) can be used to monitor the storage on the filer. An example of such an MMA is the Data Fabric Monitor (DFM) products made by Network Appliance, Inc. in Sunnyvale, Calif. The MMA may provide a Graphical User Interface (GUI) that allows the administrator to more easily observe the condition of the filer.

The MMA needs to collect information about files stored on the filer to report back to the administrator. This typically involves a scan, also referred to as a "file walk" of storage on the filer. During the file walk, the MMA can determine characteristics of files stored on the filer, as well as a basic structure, or directory tree, of the directories stored thereon. These results can be accumulated, sorted, and stored in a database, where the administrator can later access them. The MMA may also summarize the results of the file walk so they are more easily readable and understood by the administrator.

On a large system, the file walk can be a very intensive process. Additionally, the results of a typical file walk can themselves be very large and difficult to parse. An MMA typically has many tasks to perform, and generally should be available for the administrator. What is needed is a way to reduce the load on an MMA while still maintaining and monitoring attached appliances.

SUMMARY OF THE INVENTION

A method for collecting information from a storage server is disclosed. An agent scans a storage server. Information regarding files stored on the storage server is collected. The agent then summarizes the information, creating a summary. The summary is stored on a database server.

Other aspects of the invention will be apparent from the accompanying figures and from the detailed description which follows.

DESCRIPTION OF THE DRAWINGS

One or more embodiments of the present invention are illustrated by way of example and not limitation in the figures of the accompanying drawings, in which like references indicate similar elements and in which:

FIG. 4 illustrates a table displaying a list of interesting files;

FIG. 5 illustrates a table listing information about directories on the server;

DETAILED DESCRIPTION

Described herein are methods and apparatuses for Pre-summarization and Analysis of Results Generated by an Agent. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, an agent is coupled to a storage server through a network. The storage server is monitored by a Multi-Appliance Management Application (MMA). The agent performs a scan, or a "file walk," of the storage server and returns the results to the MMA through the network. The results can then be stored on a database server. The agent is responsible for collecting information about files stored on the storage server. The agent is also responsible for generating summaries, including tables and histograms, of relevant and requested information about the files on the server before the information is transferred to the MMA. In this way, the agent pre-summarizes the information before it is transmitted to the MMA. As a result, the MMA is not burdened with the task of summarizing the information, and the summaries are available to an administrator as soon as they are requested.

The MMA is generally a single server that is used to allow a system administrator to monitor a storage or file server.

When a large storage server is monitored, the MMA may have difficulty performing its monitoring duties and a file walk at the same time. In fact, the file walk may make the MMA inaccessible to the system administrator, and the MMA may become a bottleneck, since it may be incapable of performing the file walk in a reasonable amount of time. According to an embodiment of the invention, independent agents are used to perform the file walk, to reduce the load on the MMA. At a later time, the system administrator may want summarized information about the file server. Instead of having the MMA summarize the information, the summaries are compiled by the agent during the file walk, and stored on the database.

Figure 1:
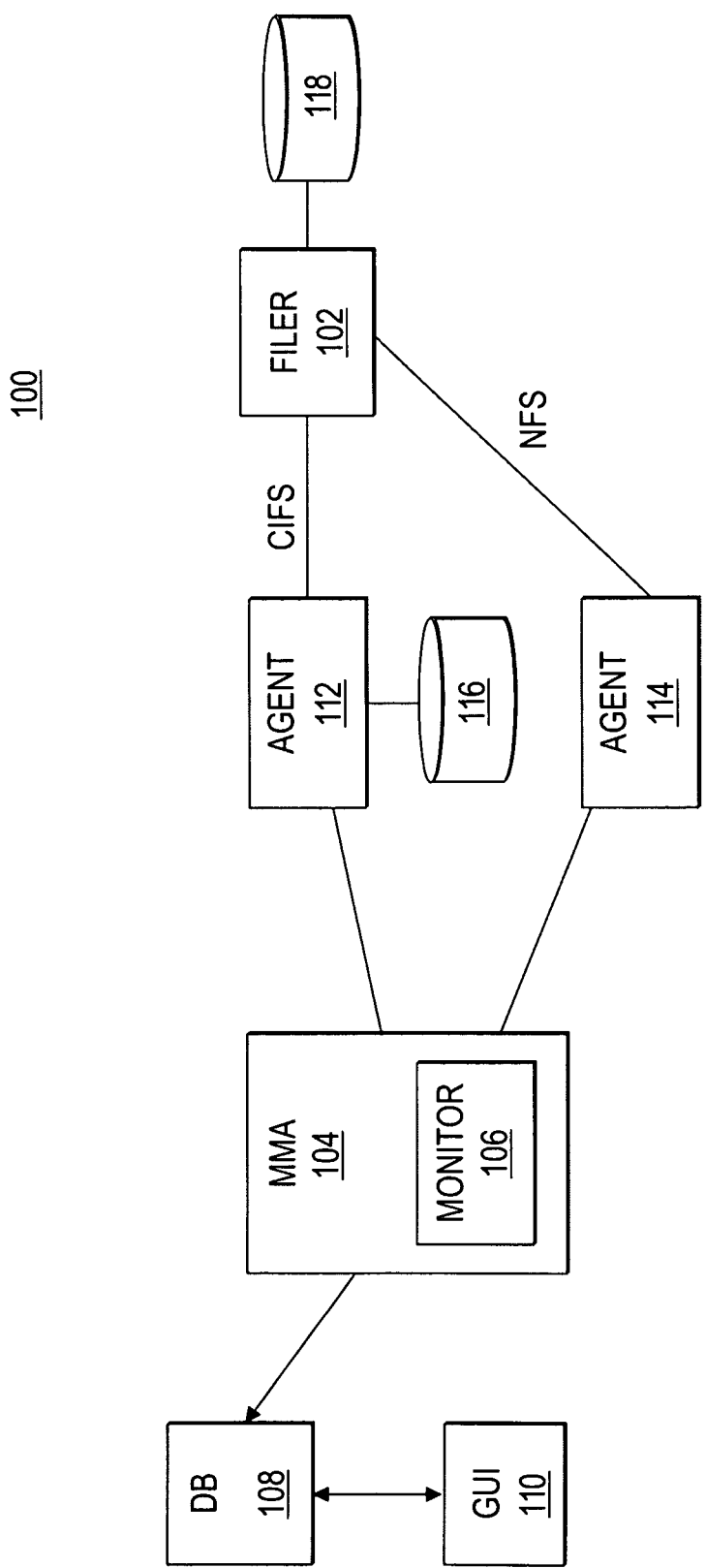
FIG. 1 illustrates a monitoring system for a storage server.

FIG. 1 illustrates a monitoring system for a storage server. The system 100 includes a filer 102, an MMA 104 including a monitor 106, a database 108, a graphical user interface (GUI) 110, and two agents 112 and 114. The agents 112 and 114 can perform a file walk of the filer 102 for the MMA 104. An agent may be an independent server that is attached to the network and is dedicated to performing file walks. By having an agent perform this task rather than having the MMA do it, the MMA can save its resources for other tasks, such as monitoring current activity on the filer 102 using the monitor 106. Ultimately, one goal is to minimize the amount of work the MMA is required to do. Additionally, multiple agents can be added to perform a complete file walk in less time if necessary.

According to one embodiment of the invention, the agents 112 and 114 may use a file system different from the one used by the filer 102. For example, the agent 112 uses the Common Internet File System (CIFS), while the agent 114 uses the Network File System (NFS). Here, either agent 112 or 114 is able to perform the file walk of the filer 102, regardless of the file system used by the filer 102. The agent 112 also has storage 116 to store the results of a file walk while the walk is occurring and before they are transferred to the MMA 104. The agent 114 may also have attached storage for this purpose.

The filer 102 is generally attached to a volume 118. The volume 118 may include one or more physical hard drives or removable storage drives that comprise the storage for the filer 102. For example, the volume 118 may comprise a RAID structure. The filer 102 may also be connected to other volumes that comprise storage. A file walk generally scans all files stored on the entire volume 118, regardless of whether all of the files are stored on the same physical drive. Further, although the volume 118 may contain several separate physical drives, the volume 118 may appear and function as a single entity.

The results of a file walk may be transferred to and stored on the database server 108 after the file walk is complete. The database server 108 can then be accessed by the GUI 110, so that an administrator can search the results of the file walk. The GUI 110 may allow the administrator to easily parse the results of a specific file walk, including allowing the administrator to monitor the total size of files stored on the filer, the size of particular directories and their subdirectories, the parents of specific directories, etc. These queries will be discussed in more detail below. The file walk may also collect statistics about the files on the filer, such as the total size of files, the most accessed files, the types of files being stored, etc. According to one embodiment, the GUI 110 may be a web-based Java application.

According to an embodiment of the invention, the summary is written to the database server 108 as a table or a histogram. The summary may then be accessed through a Java applet using a web browser such as Internet Explorer or Netscape. In another embodiment, the summaries are accessed using other programs. Although tables and histograms are shown here, it is understood that any appropriate manner of relaying the summary data to the administrator may be used.

Figure 2:
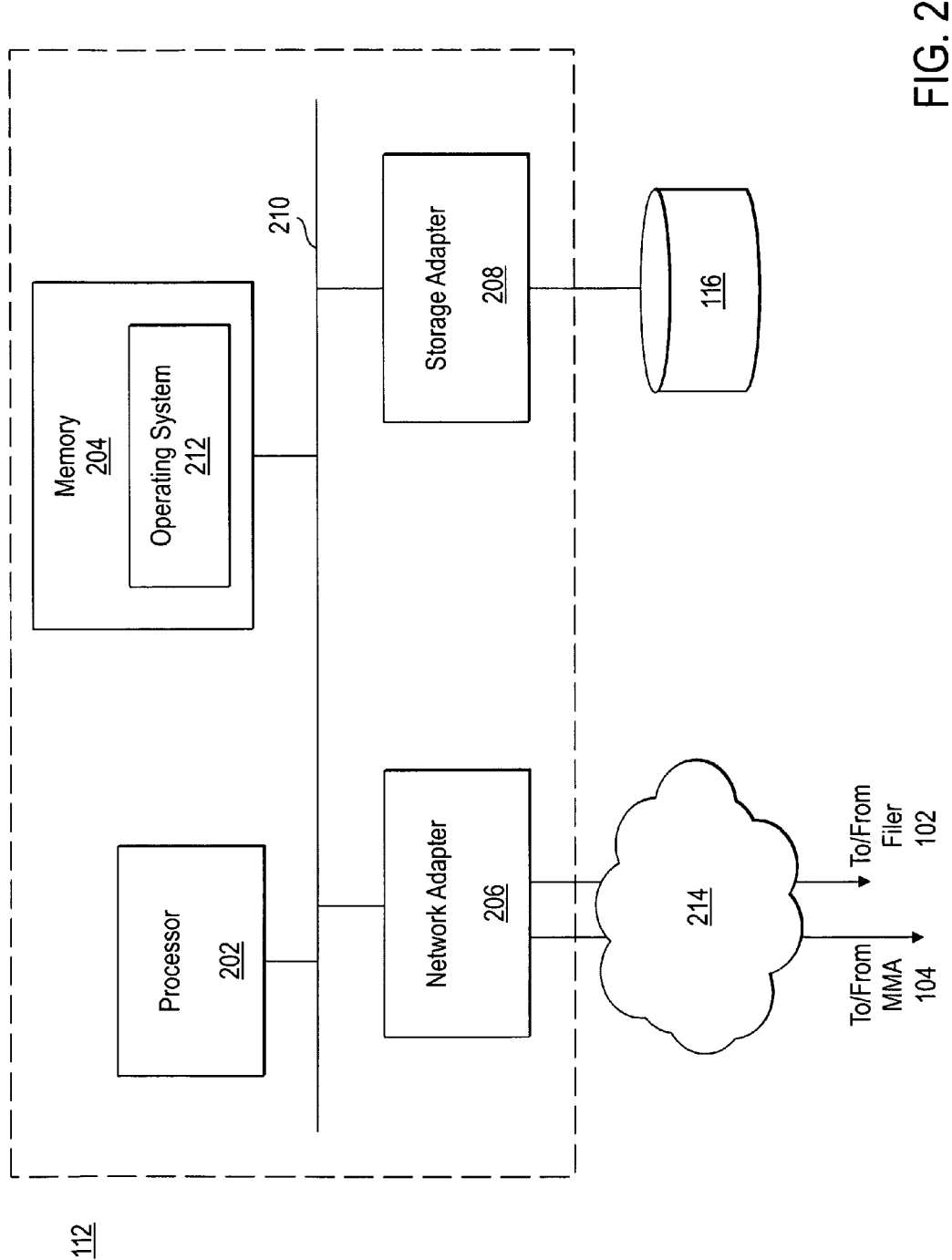
FIG. 2 illustrates a block diagram of an agent.

FIG. 2 illustrates a block diagram of an agent. The agent 112 includes a processor 202, a memory 204, a network adapter 206, and a storage adapter 208. These components are linked through a bus 210. The agent 112, as shown in FIG. 2, is typical of a network server or appliance, and it is understood that various different configurations may be used in its place. The agent 114 may be similar.

The processor 202 may be any appropriate microprocessor or central processing unit (CPU), such as those manufactured by Intel or Motorola. The memory 204 may include a main random access memory (RAM), as well as other memories including read only memories (ROM), flash memories, etc. The operating system 212 is stored in the memory 212 while the agent 112 is operating. The operating system includes the file system, and may be any operating system, such as a Unix or Windows based system. The network adapter 206 allows the agent 112 to communicate with remote computers over the network 214. Here, the agent 112 will be collecting data from the filer 102 and sending data to the MMA 104. The storage adapter 208 allows the agent 112 to communicate with the storage 116 and other external storage.

Figure 3:
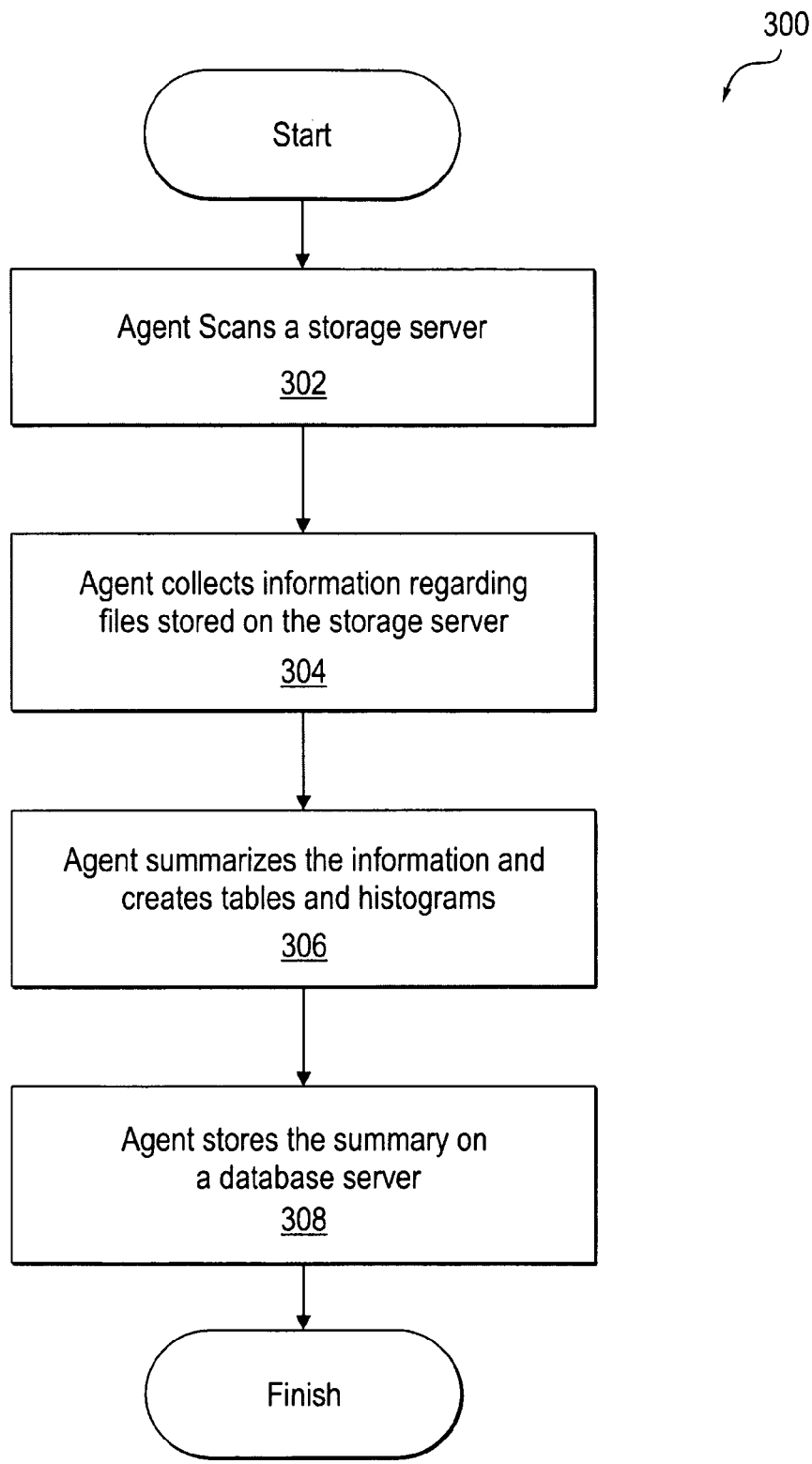
FIG. 3 is a flowchart illustrating a process for pre-summarizing and analyzing results generated by an agent.

FIG. 3 is a flowchart illustrating a process for pre summarizing and analyzing results generated by an agent. In block 302, an agent 112 scans a storage server, such as a filer 102. In one embodiment of the invention, many agents may scan different sections of the volume 118. The MMA 104 may determine how to divide the file walking task among the various agents. In one embodiment, for example, the MMA 104 may assign certain directories within the root directory to a first agent, while the other directories are assigned to a second agent. The MMA 104 may use as many agents as necessary to perform the file walk. For example, when scanning a very large volume 118, several agents may be necessary to perform the file walk in an acceptable time. As a further example, the administrator may want to perform the file walk very quickly, and may assign additional agents to expedite the task.

During the file walk scanning, in block 304, the agent 112 collects information about files stored on the volume 118. This information may include file names, directory names, file sizes, dates of creation, etc. The file walk may be performed by one or more 'threads.' A thread may be a program capable of operating independently of other programs. Using a single threaded system, the agent scans directories found on the volume 118 with a single thread. A multi-threaded system may include two or more threads. A file thread can be used to scan and determine characteristics of files, while a directory thread can be used to determine the contents of directories. A directory queue and a file queue are also established. The directory thread examines the directory found at the top of the directory queue, and places that directory's contents into the file queue. The file thread then examines the members of the file queue, placing directories in the directory queue and examining files. The file thread may collect information including the name of the file, the size of the file, the location of the file, the type of file, the time of creation of the file, the time of last access of the file, and the owner of the file. This information will be used to create the tables and histograms in FIGS. 4-7. The directory thread may also report information about the directory structure on the volume 118.

In block 306, the agent summarizes the collected information and creates tables and histograms. Examples of the summarized information will be shown in FIGS. 4-7. There are several types of summaries that the agent can create. For example, the agent can create a table of interesting files, a table of directory or user information, histograms listing the types of files stored, etc. In block 308, the summarized information is stored on the database server 108. The GUI 110 may be used to later access the stored information.

FIG. 4 illustrates a table displaying a list of interesting files. While collecting the file data, the agent 112 may keep track of certain statistics about the files on the storage server 102. For example, the table 400 includes a list of several files that the agent 112 has tracked. The agent 112 has been instructed to keep track of the largest file found, the smallest file found, the least recently accessed file found, and the oldest file found. Although these types of files are listed, it is understood that any characteristic may be tracked. For example, the agent 112 may also track the most accessed file, the directory with the largest number of files, etc. The table 400 may also include the top 'n' files of each type, where 'n' is a number specified by the administrator or the MMA 104. The table 400 may be configured so that the GUI 110 can access and display its contents.

Summaries are useful for a number of reasons. The summaries can give an administrator a quick overview of the operation of the filer 102. The summaries can also point out trouble spots or potential trouble spots. An administrator needs a quick and easy way to monitor a filer 102, and the summaries can be tailored to provide important information. Since the volume 118 may be very large, containing hundreds of thousands or millions of files, it may be impractical for the MMA 104 to summarize the file walk metadata. Therefore, the agents 112 and 114 can generate the summaries while the file walk is occurring. It is easy to add more agents if necessary to cope with the additional workload created by the generation of the summaries. By shifting the summarization task to the agents 112 and 114, the MMA 104 will be more responsive to the requests of the administrator.

A row 402 lists the name and last date of access of the least recently accessed file on the storage server 102. This information is useful if a system administrator is trying to determine whether there are any old or unused files on the volume 118. For example, if the least recently accessed file was accessed less than six months ago, the administrator may determine that no corrective action is necessary. However, as shown here, there is at least one file that has not been accessed for several years. The table 400 may be configured so that several other old files may also be listed. For example, the table may list any file that has not been accessed in the last year. The administrator can then make a determination about whether the file should be purged or retained. The administrator can determine what to do with these old files. For example, the administrator may delete them or move them to another storage server. In one embodiment, these actions are automated.

The row 404 lists the largest file found on the filer 102. This information may be useful to an administrator who needs to create or maintain free space on the server, and is looking for large files to remove. Here, a user is storing a very large movie file, which is occupying a sizeable percentage of the server's storage space. The administrator can target this file, deleting it if necessary. The administrator can also configure the agent 112 to include a list of several of the largest files found on the volume.

The row 406 lists the smallest file found. The row 408 lists the oldest file found. This information may be useful to an administrator trying to determine what type of usage occurring on the server. It is understood that other details may also be listed regarding the files on the volume 118. It is further understood that the GUI 110 may provide a customizable interface in which an administrator can specify what types of summaries and histograms will be provided.

FIG. 5 illustrates a table listing information about directories on the server 102. The table 500 includes several columns, listing the directory name in the column 502, the number of files in the directory in the column 504, the total size of the files in the directory in the column 506, and the average time of the last access to files in the directory in the column 508. The agent 112 collects this information during the file walk, and compiles the table. The MMA 104, in many instances, does not have the resources to generate these tables or collect these results. This is especially true where there are several agents scanning a single storage server. Having the agents perform these tasks will save resources that the MMA 104 may require for other tasks.

The collected information about the directories on a storage server can be useful for several reasons. The administrator can find bottlenecks in the system, as well as directories that have an abnormally large number of files or total size. In other embodiments, another table, similar to the table 500 may be generated. This table may include cumulative statistics that list the total number of files in a directory, including the total statistics for all embedded directories found within that directory. For example, the column 506 may list the total size of all files in a directory and in the directory's subdirectories.

The column 508 lists the average last access time for the files located in the listed directory. The column 508 lists a time stamp, in other words, an average time during which all files in the directory were last accessed. For example, if a directory contained five files, one most recently accessed today, one yesterday, one two days ago, one three days ago, and the last four days ago, the average access time would be sometime two days ago. This is useful so that an administrator can easily determine how active the particular directory is, and whether there are a large number of files that are not being regularly accessed. For example, it appears that there are a number of stale files in the directory '/u/users/a/Aaron/' since the average access time is over eighteen months ago.

Figure 6:
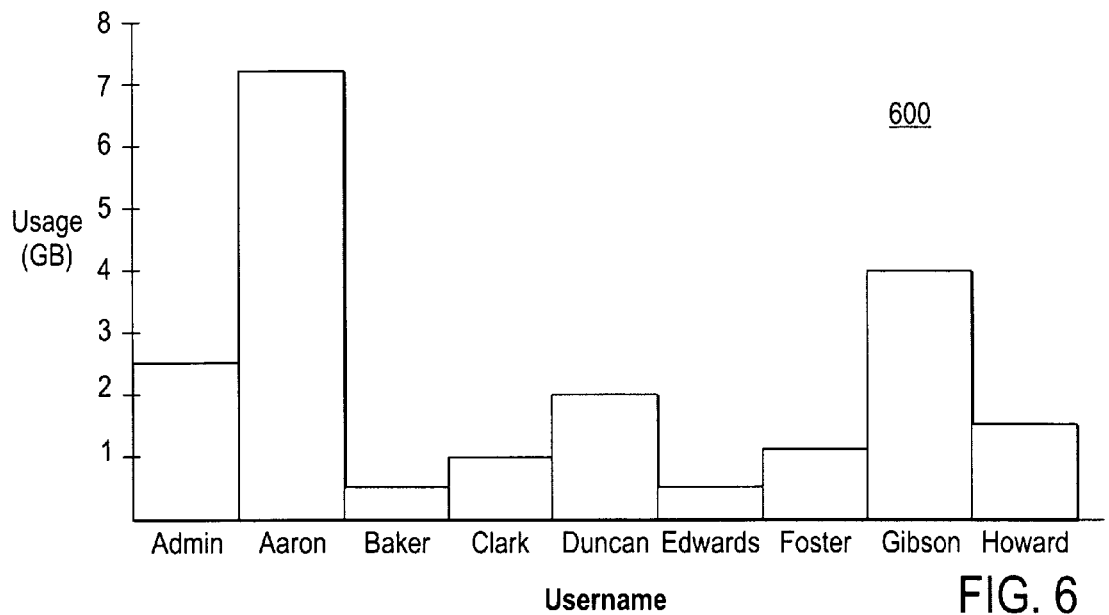
FIG. 6 illustrates a histogram showing server usage of certain users.

FIG. 6 illustrates a histogram showing server usage of certain users. The histogram 600 demonstrates how much space each user is occupying on the volume 118. An administrator can use this data to determine whether one user is occupying an abnormally large amount of space. In one embodiment, the MMA 104 can use this information to revoke the user's ability to store any more files. For example, the users 'Aaron' and 'Gibson' are using much more storage space than the other users. The administrator can target these users to increase the amount of free space on the server, if needed.

The histogram 600 may be personalized by the administrator. For example, in a system with many users, it may be difficult for the administrator to parse the histogram 600. Therefore, the histogram 600 may list the users with the highest usage first, or only those users that are using more than a specified amount of storage space. A histogram showing the usage of many users may allow an administrator to determine the approximate percentage of users that are using an abnormally large amount of server space. It is understood that the data represented in the histogram 600 may also be displayed in other forms, such as in table form.

Figure 7:
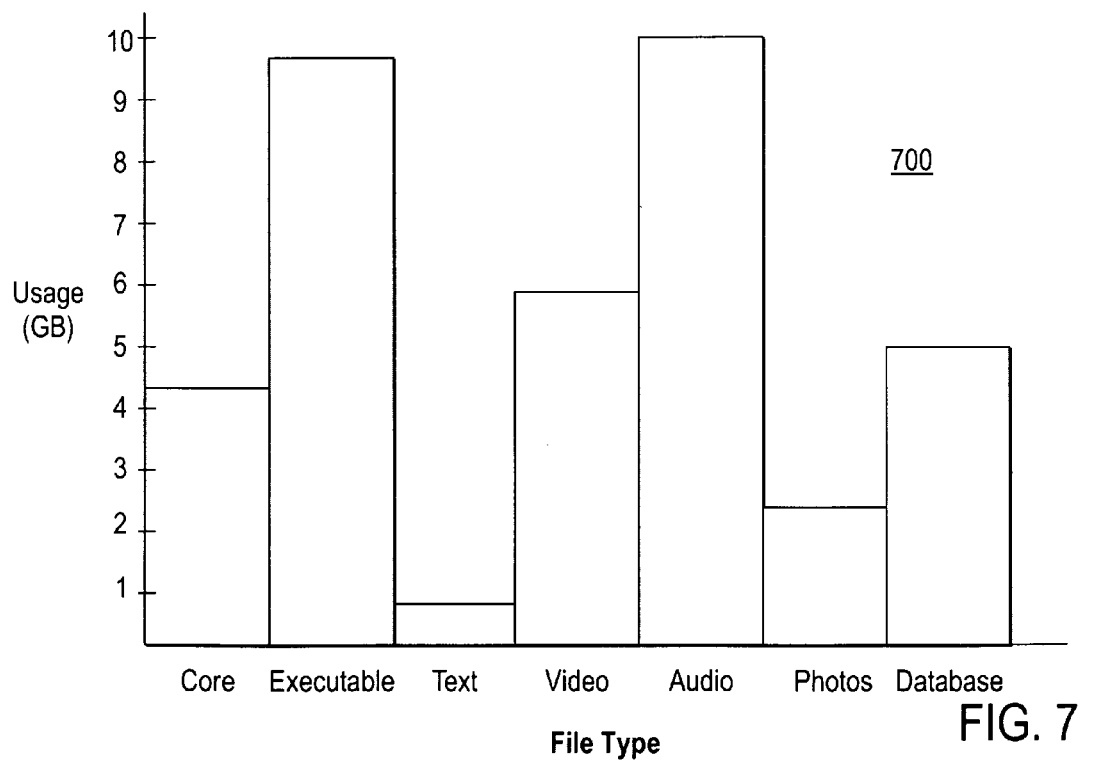
FIG. 7 illustrates a histogram showing the types of files stored on a server.

FIG. 7 illustrates a histogram showing the types of files stored on a server. The histogram 700 can be useful to determine the typical usage of the server, and to point out improper usage. The histogram indicates several different types of files, including core files, executable files, text files, video files, audio files, photos, and database files. In another embodiment, the types of files may be listed by a file extension or other file identifier. For example, the histogram 700 may include a category for those files having an '.mp3' extension if an administrator wants to determine the amount of system space used by these files. It is understood that many different types of files may be reported in the histogram 700. It is further understood that the amount of usage may be represented as a percentage of total storage space.

As can be seen from the histogram 700, there are approximately 10 GB of audio files and 6 GB of video files stored on the server. Depending on the use of the server, this may or may not be a problem. For example, the server may be a web server that hosts multimedia files. In this case, it would be appropriate to have this amount of media files compared to other files. However, if the server is a corporate server, it may be inappropriate for individual users to be stored video and audio files in their personal accounts. The histogram 700 can serve as an indication to the system administrator that action needs to be taken regarding these files. It is understood that an administrator may also specify that the file type is only displayed if the files of a specific type are occupying an abnormally large amount of space on the volume 118.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications changes may be made to these embodiments without departing from the broader spirit and scope of the invention. Specification and drawings are accordingly, to be regarded in an illustrative rather than in a restrictive sense.

What is claimed is:

1. A method comprising: defining, by a multi-appliance management application (MMA), a plurality of subsets of data stored at one or more storage servers, the one or more storage servers monitored by the MMA, the one or more storage servers storing the subsets of data at a first storage device associated with the one or more storage servers, the one or more storage servers using a first file system of the one or more storage servers to store the subsets of the data at the first storage device;
   determining, by the MMA, an amount of the data stored at the one or more storage servers;
   determining, by the MMA, a set of a plurality of agent devices to be deployed as a function of the amount of the data;
   causing each agent device, of the set of the plurality of agent devices distributed over one or more networks, to collect information about data in a corresponding subset of the plurality of subsets maintained by the one or more storage servers over the one or more networks, each of the set of the plurality of agent devices operable to:
   collect the information from any of the one or more storage servers monitored by the MMA, and
   analyze the collected information to generate:
   summarized information including a table and a histogram, and statistics regarding the collected information; and
   receiving, by the MMA, information representative of the collected information from the set of the agent devices, wherein each of the set of the agent devices, the MMA, and the one or more storage servers is an independent processing system.

2. The method of claim 1, wherein the set of the agent devices, while collecting the information from the one or more storage servers, use a file system that the one or more storage servers do not use for maintaining files.

3. The method of claim 1, wherein one or more of the set of the agent devices uses a file system different from a file system that one or more of the other agents use.

4. A system comprising: a multi-appliance management application (MMA) to manage one or more storage servers over one or more networks, the MMA configured to define a plurality of subsets of data stored on the one or more storage servers, the one or more storage servers storing the subsets of data at a first storage device associated with the one or more storage servers, the one or more storage servers using a first file system of the one or more storage servers to store the subsets of the data at the first storage device; and
   a set of a plurality of agents distributed over the one or more networks, each agent of the set of the plurality of agents operable to collect information about data in a corresponding subset of the plurality of subsets maintained by the one or more storage servers and send information representative of the collected information to the MMA, wherein the set of the plurality of agents to be deployed is determined by the MMA as a function of an amount of the data stored at the one or more storage servers,
   wherein each of the set of the plurality of agent devices is operable to:
   collect the information from any of the one or more storage servers managed by the MMA, and
   analyze the collected information to generate:
   summarized information including a table and a histogram, and statistics regarding the collected information; and
   wherein each of the set of the plurality of agents, the MMA and the one or more storage servers is an independent processing system.

5. The system of claim 4, wherein one or more of the set of the plurality of agents, while collecting the information from the one or more storage servers, use a file system that the one or more storage servers do not use for maintaining the files.

6. The system of claim 4, wherein one or more of the set of the plurality of agents uses a file system different from a file system that one or more of the other agents of the set use.

7. A system comprising: a processor; a memory coupled with the processor; and logic operable to cause the system to:
   collect information about a specific subset of data maintained by any of one or more storage servers connected to a network, wherein a multi-appliance management application (MMA) defines a plurality of subsets of data maintained by the one or more storage servers and assigns the specific subset of data to the system, the one or more storage servers storing the subsets of data at a first storage device associated with the one or more storage servers, the one or more storage servers using a first file system of the one or more storage servers to store the subsets of the data at the first storage device, wherein the system is one of a plurality of systems, the system selected by the MMA to collect the information based on an amount of the data stored at the one or more storage servers;

summarize the collected information, the summarized collected information including a table and a histogram, and analyze the collected information to generate statistics regarding the collected information; and send the summarized collected information to the MMA connected to the network, wherein each of the storage servers and the MMA is a processing system independent from said system.

8. The system of claim 7 further comprising a storage adapter coupled with the processor, the storage adapter configured to allow the processor to communicate with an external storage device.

9. The system of claim 8 wherein the logic further causes the summarized collected information to be stored on the external storage device.

10. The method of claim 1 further comprising
receiving, by the MMA, the summarized information.

11. The system of claim 4 wherein the set of the plurality of agents are further operable to send the summarized collected information to the MMA.

12. A non-transitory machine readable storage medium having stored thereon executable program code which, when executed, causes a computing device to collect information from any of one or more storage servers managed by a multi-appliance management application (MMA), the executable program code comprising:

program code for performing a file walk of a specific subset of data maintained by the one or more storage servers over one or more networks, wherein each of the one or more storage servers is an independent processing system from the computing device and the MMA defines a plurality of subsets of the data maintained by the one or more storage servers and assigns to the computing device the specific subset on which to perform the file walk, the one or more storage servers storing the subsets of data at a first storage device associated with the one or more storage servers, the one or more storage servers using a first file system of the one or more storage servers to store the subsets of the data at the first storage device, wherein the computing device is one of a plurality of computing devices, the computing device selected by the MMA to collect the information based on an amount of the data stored at the one or more storage servers; and program code for collecting information about data in the subset of data maintained by the one or more storage servers;

program code for analyzing the collected information and generating statistics regarding the collected information;

program code for summarizing the collected information, the summarized collected information including a table and a histogram; and program code for sending the summarized collected information to the MMA, wherein the MMA is an independent processing system from the computing device.

13. The non-transitory machine readable storage medium of claim 12, wherein the executable program code further comprises program code for creating a summary of the collected information.

14. The non-transitory machine readable storage medium of claim 12, wherein the executable program code further comprises program code for displaying the collected information through a network.

15. The method of claim 1, wherein each agent device uses a multi-threaded system to collect information, the multi-threaded system including:

a file thread to collect information about files in a file queue; and a directory thread to examine directories and place files contained in the directories into the file queue.

16. The method of claim 1 further comprising, assigning, by the MMA, each subset of data to one or more agent devices of the set of the plurality of agent devices distributed over one or more networks.

17. The method of claim 16, wherein each subset of data is assigned to a different agent device.

18. The system of claim 4, wherein the MMA is configured to assign each subset of data to one or more agents of the set of the plurality of agents.

* * * * *